May 21, 1929.  H. F. BECHMAN  1,714,153
JOURNAL BOX
Filed April 19, 1926
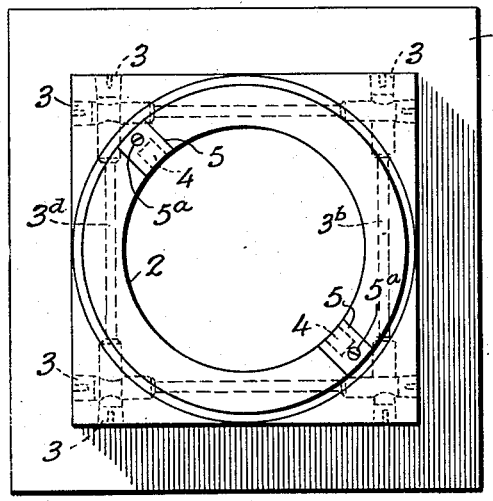
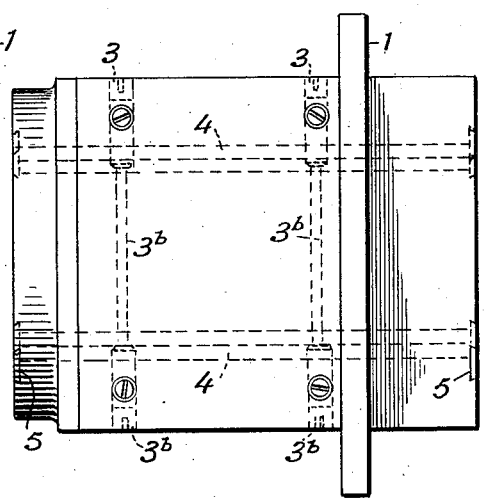
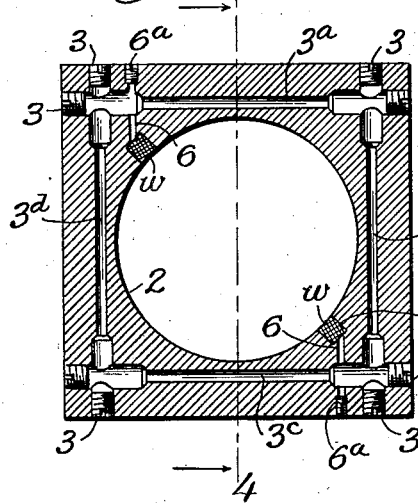
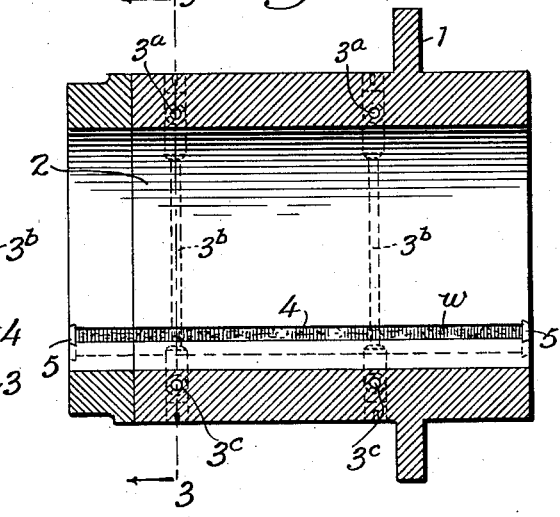
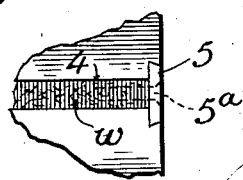

Patented May 21, 1929.

1,714,153

UNITED STATES PATENT OFFICE.

HENRY F. BECHMAN, OF BATTLE CREEK, MICHIGAN, ASSIGNOR TO DUPLEX PRINTING PRESS COMPANY, OF BATTLE CREEK, MICHIGAN, A CORPORATION OF MICHIGAN.

JOURNAL BOX.

Application filed April 19, 1926. Serial No. 102,997.

This invention is a novel journal box especially designed and intended for use for supporting the journals of the plate and impression cylinders of rotary printing presses; but such boxes may be used for supporting the journals of other rotatable parts of other machines.

The principal object of the invention is to provide a journal box which can be readily placed in the opening in the machine frame in which such box is to be mounted, and which box can be set therein any side uppermost, and can be removed, partly turned, and replaced so as to present another side uppermost, when it is desired to change the point of wear on the box. A further object is to make the box a self-oiling box, so that in all operative positions of the box the journal confined therein will be thoroughly lubricated; and in all operative positions of the box oil can be supplied to the ducts therein through openings in the top thereof.

I will explain the invention with reference to the accompanying drawings, which illustrate one practical embodiment thereof, and summarize in the claims the essentials of the invention and novel features of construction for which protection is desired.

In said drawings:

Figure 1 is an end view of the box detached,

Figure 2 is a side view thereof,

Figure 3 is a transverse section on the line 3—3, Figure 4,

Figure 4 is a longitudinal section on the line 4—4, Figure 3, and

Figure 5 is a detail.

The box comprises a body preferably made of a suitable anti-friction metal, and polygonal in cross section, the box being shown as square in cross section. The box may be of any suitable length, and is shown as provided with an exterior flange 1 near one end which is useful in properly positioning the box endwise in the opening in the press frame (not shown) in which the box is secured in any suitable manner. The body has a longitudinal cylindrical bore 2 of such diameter as to have a close running fit on or to the journal (not shown) to be mounted in the box.

The box is provided with oil ducts exterior to and surrounding the bore 2, such oil ducts are preferably formed by drilling four holes $3^a$, $3^b$, $3^c$, $3^d$, in the body, each of these holes extending transversely through the box; said holes intersecting near the angles of the box, as clearly shown in Figure 3. These holes can be easily drilled in the box and the outer portion of each hole is preferably enlarged and internally threaded for the engagement of plugs 3 (which are shown as headless screws), and when these plugs are in place no oil can escape. Said holes together form a complete oil duct extending entirely around the bore 2.

Preferably the box is provided with a plurality of such oil ducts, two being shown in the drawings respectively adjacent opposite ends of the box. When it is desired to supply oil to the ducts, the uppermost plug, or plugs, 3 can be removed and the ducts filled with oil, and the plug or plugs replaced. It does not matter which side of the box is uppermost as access can always be had to the oil ducts by removing the uppermost plugs.

If desired an ordinary sight feed oiler, or other feed device, (not shown) may be used to introduce oil into the ducts at the top of the box, by removing the top plugs 3 from the upper ends of the vertical holes and connecting such oiler or device in the usual manner to such hole.

The box is further provided with longitudinal journal lubricating channels 4, two such channels being shown, but more may be used if desired, but two have been found amply sufficient. These channels are preferably spaced 180° apart and each is preferably filled with suitable material such as fibre, wicking or felt, such as indicated at $w$. The wicking, felt or other suitable absorbent material $w$ in the channels 4 disseminates and distributes the oil uniformly along the entire length of the channel and supplies oil to the journal in the bore. For economy I preferably cut the channels 4 entirely through the metal of the box, from end to end of the bore 2, and then close the outer ends of such channels by small segmental plates 5 which may be fitted in shallow dove-tailed recesses in the ends of the box at the outer ends of the channels, said plates being secured by screws $5^a$ as indicated in the drawings.

Each channel 4 is supplied with oil from the oil ducts above referred to by means of passages 6 connecting each channel with adjacent oil duct. These passages 6 can be readily formed by drilling holes 6 directly through the sides of the box to intersect the bores (as $3^a$ and $3^c$, for example) and enter the bottoms of the channels 4, see Fig. 3. The outer ends of the holes 6 can be closed by screw plugs 6ª, as indicated in the drawings.

A box constructed as described provides an absolutely smooth bearing surface at the pressure point with an assured supply of oil. If the box should show any wear at the pressure point it can be readily turned upside down, and then the box would be in exactly the same condition as at the first with a comparatively fresh or unused portion of the bearing surface made subject to the pressure.

If desired additional channels 4 might be cut in the box so that it could be given just a quarter turn, if it was desired to change the point of wear in the bore. The box is preferably finished absolutely square with the bore 2 at the absolute center of the square, so that the exact position of the axis of the bore will not be affected nor changed by turning the box and resetting it when desired.

I claim:

1. A rotatorially adjustable journal box adapted to be removably secured in an opening in the frame of the machine in which such box is to be mounted; said box comprising a body polygonal in cross section, and having a longitudinal bore, oil ducts exterior to said bore, longitudinal channels in the bore, and oil passages connecting the ducts with the channels; said ducts, channels and passages being so relatively disposed that lubricant can be supplied to the box at the top thereof in any adjusted position of the box.

2. A rotatorially adjustable journal box adapted to be removably secured in an opening in the frame of the machine in which such box is to be mounted; said box being polygonal in cross section and having a longitudinal bore, intersecting oil ducts surrounding the bore, closures for the outer ends of said ducts; longitudinal channels in the bore and opening through the ends of the box; closures for the outer ends of said channels; and passages intersecting the ducts and connecting the ducts with the channels; said ducts, channels and passages being so relatively disposed that lubricant can be supplied to the box at the top thereof in any adjusted position of the box.

3. A rotatorially adjustable journal box adapted to be removably secured in an opening in the frame of the machine in which such box is to be mounted; said box being square in cross section and having a longitudinal bore, channels in the sides of the bore, oil ducts formed by holes extending through the body of the box exterior to the bore, means for closing the outer ends of said holes, and oil passages connecting the ducts with the said channels; said ducts, channels and passages being so relatively disposed that oil can be supplied to them at the top of the box—no matter which side of the box is uppermost.

4. A rotatorially adjustable journal box adapted to be removably secured in an opening in the frame of the machine in which such box is to be mounted; said box being square in cross section and having a longitudinal bore; longitudinal channels in the sides of the bore, oil ducts formed by intersecting holes extending straight through the body of the box exterior to and at right angles to the bore and connecting the channels with the different outside faces of the box; means for closing the outer ends of said holes but permitting the uppermost to be opened for introduction of oil, and oil passages intersecting the oil ducts and connecting the ducts with the said channels; said ducts, channels and passages being so relatively disposed that oil can be supplied to them at the top of the box—no matter which side of the box is uppermost.

5. A journal box adapted to be removably secured in an opening in the frame of the machine in which such box is to be mounted; said box being square in cross section and having a longitudinal bore; longitudinal channels in the walls of the bore, said channels extending through the bore and opening into the bore and also open at their outer ends, closures for the outer ends of said channel, and oil ducts surrounding the bore, each duct being formed by a hole extending straight through the body of the box exterior to and at right angles to the bore; said holes intersecting near the angles of the box, passages intersecting the oil ducts and connecting them with the channels, and plugs closing the outer ends of said holes and passages; said ducts, channels and passages being so relatively disposed that oil can be supplied to them at the top of the box—no matter which side of the box is uppermost.

In testimony that I claim the foregoing as my own, I affix my signature.

HENRY F. BECHMAN.